United States Patent Office 3,701,790
Patented Oct. 31, 1972

3,701,790
ANTIBIOTIC SPHAEROPSIDIN
John H. Coats and Milton E. Herr, Kalamazoo, and Ross R. Herr, Portage, Mich., assignors to The Upjohn Company, Kalamazoo, Mich.
No Drawing. Application Mar. 4, 1968, Ser. No. 709,901, now Patent No. 3,585,111, which is a continuation of application Ser. No. 506,853, Nov. 8, 1965. Divided and this application Mar. 3, 1971, Ser. No. 120,703
Int. Cl. C07d 1/18
U.S. Cl. 260—348 C
1 Claim

ABSTRACT OF THE DISCLOSURE

Antibiotic sphaeropsidin producible by culturing a fungus belonging to the class Fungi imperfecti, genus Phoma, in an aqueous nutrient medium. Sphaeropsidin is an antifungal agent and can be used in shoe uppers.

CROSS REFERENCE TO RELATED APPLICATION

This is a division of co-pending application Ser. No. 709,901, filed Mar. 4, 1968, which was a continuation of application Ser. No. 506,853, filed Nov. 8, 1965, and now abandoned.

BRIEF SUMMARY OF THE INVENTION

Sphaeropsidin (U–15,966) has the following structural formula:

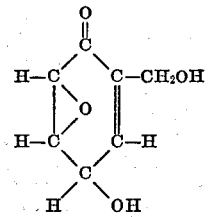

(I)

Sphaeropsidin is a neutral substance which has the property of adversely affecting the growth of certain microorganisms, for example, Staphylococcus aureus, Proteus vulgaris, Salmonella typhosa, Salmonella pullorum, Nocardia asteroides, Coccidioides neoformans, and Trichophyton mentagrophytes, and can be used alone or in combintion with other antibacterial and antifungal agents to prevent the growth of, or reduce the number of, such organisms present in various environments.

Sphaeropsidin also has cytototxic activity against KB human carcinoma cells in tissue culture. For example, sphaeropsidin caused 50% inhibition of the growth of KB cells in tissue culture at a concentration of 0.5–1 mcg./ml.

Novel di- and tetraacrylates of sphaeropsidin are formed by reacting sphaeropsidin with the anhydride of the selected carboxylic acid in the presence of an acid-binding agent, for example, a tertiary amine. Suitable acid-binding agents include heterocyclic amines, such as pyridine, quinoline, and isoquinoline; trialkyl amines, such as trimethylamine, triethylamine, triisopropylamine, and the like; N,N-dialkyl anilines, such as dimethyl aniline, diethyl aniline, and the like; and N-alkyl piperidines, such as N-ethyl piperidine, N-methyl piperidine, and the like. The preferred base is pyridine. The reaction is advantageously conducted by treating a suspension of sphaeropsidin in the tertiary amine with the anhydride and heating the resulting mixture, if desired, for a short period at a temperature not greater than 100° C. to complete the reaction. The resulting ester can be isolated by conventional procedures. Upon reacting sphaeropsidin in pyridine with at least four moles of acylating agent, there is obtained sphaeropsidin tetraacylate. When the molar ratio of acid anhydride to sphaeropsidin is less than 4:1 the reaction product normally will consist mainly of diacylated sphaeropsidin though some tetraacylated sphaeropsidin will also be present. Such a mixture can be separtaed into its component parts by conventional procedures, for example, using counter-current distribution procedures or partition chromatography. Upon reacting sphaeropsidin with two moles of acylating agent, in the presence of pyridine, there is obtained sphaeropsidin diacylate.

Sphaeropsidin tetraacylates have the following general structural formula:

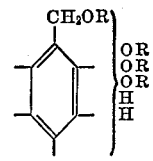

(II)

wherein R is acyl, said acyl advantageously being the acyl of a hydrocarbon carboxylic acid containing not more than 12 carbon atoms, or a halo-, nitro-, hydroxy-, amino-, cyano-, thiocyano-, and loweralkoxy hydrocarbon carboxylic acid of not more than 12 carbon atoms.

The novel diacylates of sphaeropsidin have the following structural formula:

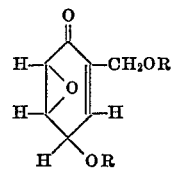

(III)

wherein R is as defined above.

Novel triacylates of sphaeropsidin are formed by reacting sphaeropsidin with the halide of a carboxylic acid in the presence of an acid-binding agent. For example, upon reacting sphaeropsidin with three moles of benzoyl chloride in pyridine, there is obtained sphaeropsidin chlorotribenzoate. The novel triacylates of sphaeropsidin have the following structural formula:

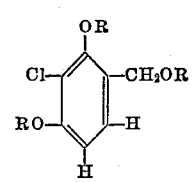

(IV)

wherein R is acyl as previously defined. Reaction time, temperature, and acid-binding agents described above for the di- and tetraacylates also can be used to form sphaeropsidin triacylates.

Sphaeropsidin di-, tri-, and tetraacylates can be used as intermediates to make polyhydroxy alcohols useful as oxygen absorbents in gas analysis, decalcifiers of bone specimens in microscopy, and as developers in photography. For example, sphaerodpsidin tetraacetate can be treated with an alcoholic solution of sulfuric acid to yield 1,2,4-trihydroxybenzyl alcohol. Sphaeropsidin chlorotribenzoate can be treated in a similar manner to give 3-chloro-2,4-dihydroxybenzyl alcohol.

Suitable hydrocarbon carboxylic acids for the above-described processes include (a) saturated or unsaturated, straight or branched chain aliphatic carboxylic acids, for example, acetic, propionic, butyric, isobutyric, tert-butylacetic, valeric, isovaleric, caproic, caprylic, decanoic, dodecanoic, acrylic, crotonic, undecylenic, hexynoic, heptynoic, octynoic acids and the like; (b) saturated or unsaturated, substituted, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid and the like; (c) saturated or unsaturated, substituted, alicyclic aliphatic carboxylic acids, for example, cyclopentaneacetic acid, cyclopentanepropionic acid, cyclopenteneacetic acid, cyclohexanebutyric acid, methylcyclohexaneacetic acid, and the like; (d) aromatic carboxylic acids, for example, benzoic acid, toluic acid, naphthoic acid, ethylbenzoic acid, isobutylbenzoic acid, methylbutylbenzoic acid and the like; and (e) aromatic-aliphatic carboxylic acids, for example, phenylacetic acid, phenylpropionic acid, phenylvaleric acid, cinnamic acid, phenylpropiolic acid and naphthylacetic acid, and the like. Suitable halo-, nitro-, hydroxy-, amino-, cyano-, thiocyano-, and lower alkoxy hydrocarbon carboxylic acids of not more than twelve carbon atoms include hydrocarbon carboxylic acids as given above which are substituted by one or more of halogen, nitro, hydroxy, amino, cyano, or thiocyano, or loweralkoxy, advantageously loweralkoxy of not more than six carbon atoms, for example, methoxy, ethoxy, propoxy, butoxy, amyloxy, hexyloxy, and isomeric forms thereof. Examples of such substituted hydrocarbon carboxylic acids are mono-, di-, and trichloracetic acid; α- and β-chloropropionic acid; α- and γ-bromobutyric acid; α- and δ-iodovaleric acid; mevalonic acid; 2- and 4- chlorocyclohexanecarboxylic acid; shikimic acid; 2-nitro-1-methyl-cyclobutanecarboxylic acid; 1,2,3,4,5,6 - hexachlorocyclohexanecarboxylic acid; 3-bromo - 2 - methylcyclohexanecarboxylic acid; 4- and 5-bromo-2-methylcyclohexanecarboxylic acid; 5- and 6-bromo-2-methylcyclohexanecarboxylic acid; 2,3 - dibromo-2-methylcyclohexanecarboxylic acid; 2,5-dibromo - 2 - methylcyclohexanecarboxylic acid; 4,5-dibromo - 2 - methylcyclohexanecarboxylic acid; 5,6-dibromo-2-methylcyclohexanecarboxylic acid; 3-bromo-3-methylcyclohexanecarboxylic acid; 6- bromo-3-methylcyclohexanecarboxylic acid; 1,6-dibromo-3-methylcyclohexanecarboxylic acid; 2 - bromo-4-methylcyclohexanecarboxylic acid; 1,2 - dibromo-4-methylcyclohexanecarboxylic acid; 3-bromo-2,2,3-trimethylcyclopentanecarboxylic acid; 1-bromo - 3,5 - dimethylcyclohexanecarboxylic acid; homogentisic acid, o-, m-, and p-chlorobenzoic acid; anisic acid, salicylic acid; p-hydroxybenzoic acid; β-resorcylic acid; gallic acid; veratric acid; trimethoxybenzoic acid; trimethoxycinnamic acid; 4,4'-dichlorobenzilic acid; o-, m-, and p-nitrobenzoic acid; cyanoacetic acid; 3,4- and 3,5 - dinitrobenzoic acid; 2,4,6 - trinitrobenzoic acid; thiocyanoacetic acid; cyanopropionic acid; lactic acid; ethoxyformic acid (ethyl hydrogen carbonate); and the like.

THE MICROORGANISM

The fungus used according to this invention for the production of sphaeropsidin belongs to the class *Fungi imperfecti*, order Sphaeropsidales, family Sphaerioidaceae, and genus Phoma. One of its strain characteristics is the production of sphaeropsidin. A subculture of the living organism can be obtained from the permanent collection of the Northern Utilization and Research Division, Agricultural Research Service, U.S. Department of Agriculture, Peoria, Ill., U.S.A. Its accession number in this repository is NRRL 3188.

The organism of this invention, when grown on potato-dextrose agar medium (sold by Difco Laboratories) formed tough, dark-colored pycnidia. When pressure was applied to the pycnidium, spores emerged from the ostiole in a cirrhus. Conidiophores were not noted. Conidia were small, one-celled, hyaline, and elongate.

The new compound of the invention sphaeropsidin is produced when the elaborating organism is grown in an aqueous nutrient medium under submerged aerobic conditions. It is to be understood also that for the preparation of limited amounts, surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, galactose, dextrin, molasses, and the like. Preferred nitrogen sources include corn steep liquor, yeast, autolyzed brewer's yeast with milk solids, soybean meal, cottonseed meal, corn meal, milk solids, pancreatic digest of casein, distiller's solubles, fish meal, animal peptone liquors, meat and bone scraps, and the like.

A combination of these carbon and nitrogen sources can be used advantageously. Trace metals, for example, zinc, magnesium, manganese, cobalt, iron, and the like need not be added to the fermentation since tap water and unpurified ingredients are used as media components.

Production of the compound of the invention can be effected at any temperature conducive to satisfactory growth of the microorganism, for example, between about 18° and 40° C. and preferably between about 25° and 30° C. Ordinarily, optimum production of the compound is obtained in about 2 to 10 days. The medium normally stays fairly close to neutral, or on the acid side during the fermentation. The final pH is dependent, in part, on the buffers present, if any, and in part on the initial pH of the culture medium which is advantageously adjusted to about pH 6–8 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention is a neutral compound having the empirical formula $C_7H_8O_4$. It is soluble in water, lower-alkanones, e.g., acetone, methyl ethyl ketone, and the like; and water-immiscible esters, e.g., ethyl acetate, amyl acetate, butyl acetate, and like aliphatic esters. Shaeropsidin is relatively unstable in base, e.g., a dilute sodium hydroxide solution decomposed completely within one or two minutes. Sphaeropsidin is slightly unstable at pH 5 in 0.1 M phosphate buffer during two months; it showed some instability in dilute hydrochloric acid during 48 hours but was quite stable in dilute acetic acid during this period. Sphaeropsidin was stable in water during short periods but decomposed slightly after several weeks. The compound showed the greatest stability dissolved in water and frozen at −50° to −70° or in acetone solution under refrigeration.

A variety of procedures can be employed in the isolation and purification of sphaeropsidin, for example, solvent extraction, liquid-liquid distribution in a Craig apparatus, the use of neutral adsorbents, and neutral partition columns.

In a preferred process, sphaeropsidin is recovered from its culture medium by separation of the mycelia and undissolved solids by conventional means such as by filtration or centrifugation. The antibiotic is then removed from the filtered or centrifuged broth by the use of surface active adsorbents, for example, decolorizing carbon or decolorizing resins, and elution of the adsorbed material with a solvent. Aqueous acetone (50%) is preferred as the eluting agent. A suitable decolorizing resin is Permutit DR (U.S. Pat. 2,702,263). The eluates obtained from the surface active adsorbent can be evaporated to dryness to provide an impure preparation of the antibiotic sphaeropsidin. This preparation can be used in environments where higher purity of the antibiotic is not necessary.

Higher purity sphaeropsidin can be obtained by subjecting an impure dry preparation of sphaeropsidin, as obtained above, to liquid-liquid distribution in a Craig apparatus. Prior to the use of the Craig apparatus, the dry preparation can be leached in the following manner. The dry preparation of sphaeropsidin, as obtained above, is dissolved in water and this solution mixed with diatomaceous earth. A water-immiscible ester, for example, ethyl acetate(preferred), amyl acetate, butyl acetate, and like aliphatic esters is then added to the slurry. This slurry is poured onto a column of diatomaceous earth which has been previously washed with ethyl acetate. The column is eluted with ethyl acetate and the eluates are concentrated under reduced pressure and a temperature of about 25 to 30° C. The resulting residue is a viscous dark oil which is best stored at below 0° C. temperature. The counter-current distribution of this material in a Craig apparatus can be performed using a solvent system consisting of water saturated with ethyl acetate in the lower phase, and ethyl acetate saturated with water in the upper phase. Other aliphatic esters, as described above, can be used in place of ethyl acetate, though ethyl acetate is preferred. Active fractions obtained from the Craig apparatus can be concentrated under nitrogen at 30° C. or lower to yield a colored oil. This oil can be dissolved in a lower-alkanone, for example, acetone (preferred), activated carbon added to the solution, and the slurry filtered through a column of silica gel which has been pre-washed with a lower-alkanone (acetone preferred). A free flow of the filtrate from the column can be maintained by applying vacuum to the receiver as necessary and washing the column with acetone. The combined filtrate and wash are stored at 0° C. or lower. This material can be concentrated by evaporation under a stream of nitrogen to a residue which can be dissolved in water and freeze-dried.

The active fractions obtained from the Craig apparatus, disclosed above, were detected by the use of thin-layer silica gel microslide plates.

The new compound of the invention, sphaeropsidin, inhibits the growth of the following bacteria in vitro:

*Staphylococcus aureus* (albus form)
*Proteus vulgaris*
*Salmonella typhosa*
*Salmonella pullorum*

Sphaeropsidin also inhibits the growth of the following fungi:

*Nocardia asteroides*
*Blastomyces dermatidis*
*Coccidioides immitis*
*Hormodendrum compactum*
*Cryptococcus neoformans*
*Trichophyton rubrum*
*Trichophyton mentagrophytes*

Sphaeropsidin can be used as the antifungal agent in the shoe uppers disclosed in U.S. Pat. 3,130,505. Further, it can be used to cleanse objects in dental offices and physicians' offices which are contaminated with the organism *Staphylococcus aureus*; it is also useful to cleanse stacked food utensils contaminated with this organism.

The following examples are illustrative of the processes and products of the present invention but are not to be construed as limiting. All percentages are by weight and all solvent mixture proportions are by volume unless otherwise noted.

EXAMPLE 1

(A) *Fermentation*

A soil stock of the fungus which belongs to the class *Fungi imperfecti*, order Sphaeropsidales, family Sphaerioidaceae, and genus Phoma, NRRL 3188, was used to inoculate a series of 500-ml. Erlenmeyer flasks containing 100 ml. of sterile seed medium consisting of the following ingredients:

| | G. |
|---|---|
| Glucose monohydrate | 20 |
| Malt extract (non-diastatic) | 15 |
| Wilson's peptone liquor No. 159 [1] | 20 |
| $K_2HPO_4$ | 0.5 |
| Pabst yeast | 2.5 |
| Tap water q.s., 1 liter. | |

[1] Wilson's peptone liquor No. 159 is a preparation of enzymatically hydrolyzed proteins of animal origin.

The pre-sterilization pH of the seed flask medium was 6.8. The seed inoculum was grown for 72 hours at a temperature of 25° C. on a Gump rotary shaker operating at 90 four-inch strokes per minute.

Seed flask inoculum (5 ml.), described above, was then used to inoculate each of a series of 500-ml. Erlenmeyer fermentation flasks containing 100 ml. of sterile fermentation medium consisting of the following ingredients:

| | G./liter |
|---|---|
| Glucose monohydrate | 40 |
| Wilson's peptone liquor No. 159 | 20 |
| Malt extract (non-diastatic) | 25 |
| Phenylacetic acid | 2 |
| Tap water, balance. | |

The pre-sterilization pH of the fermentation flask medium was 7.0. The fermentation flasks were grown for 5 days at 28° C. on a Gump rotary shaker operating at 250 r.p.m. with a 2½ inch stroke. The pre-harvest KB agar disc assay on a typical fermentation flask was 34 KB biounits of sphaeropsidin/ml. The assay procedure is as follows:

Paper discs (12.5 mm.), saturated with the solution to be tested, were placed on trays containing $4 \times 10^5$ Eagle's KB epidermoid carcinoma cells per ml. of modified Miyamura agar (see Grady, J. E., Lummis, W. L. and Smith, C. G., Proc. Soc. Exptl. Biol. and Med., 103:727, 1960). The trays were incubated at 37° C. for 16 hours and zones of activities on the trays were detected by spraying the agar with a 0.4 percent solution of 2,6-dichlorophenol-indophenol in methanol-saline (1:9 by volume). After one hour, during which time the unaffected cells reduced the blue dye, the zones of activity appeared dark blue against a colorless or light blue background.

A KB biounit (KBU) gives a 20 mm. zone of inhibition when 0.08 ml. of test solution is applied to the paper disc.

(B) *Carbon absorption*

The whole broth (200 ml. assaying 34 biounits/ml. on the KB agar disc assay) from a sphaeropsidin fermentation, as described above, was filtered with the aid of diatomaceous earth as required. During the filtration operation, the cake was washed with ⅕ volume of water. The filtered beer and wash were combined (194 ml. assaying 36 biounits/ml. on the KB agar disc assay). Activated carbon (10%) was added to the combined filtered beer and wash and the slurry was stirred for 15 to 30 minutes. The carbon was separated from the liquid by filtration and the liquid discarded. The carbon was eluted by slurrying three times with ⅓ volume of 50% aqueous acetone (pH 7) each time. The carbon was removed by filtration and the eluates combined (218 ml. assaying 31 biounits/ml. on the KB agar disc assay). The combined eluates were concentrated under reduced pressure to an aqueous concentrate (about ½₀ volume). This aqueous concentrate was then freeze-dried to give a dry preparation of impure sphaeropsidin weighing 2.04 grams and assaying 2 biounits/mg. on the KB agar disc assay.

(C) *Purification*

200 g. of an impure dry preparation of sphaeropsidin, prepared in the manner as disclosed above, was dissolved in 800 ml. of water and this solution was mixed thoroughly with 1,000 g. of diatomaceous earth. A slurry was then prepared by stirring this mixture with 16 liters of ethyl acetate for 10 minutes. This slurry was poured onto a column of 500 g. of diatomaceous earth which had been pre-washed with ethyl acetate. The column was eluted with 16 liters of ethyl acetate and the combined solvent from the leaching process was concentrated under reduced pressure at a temperature below 30° C. The residue, a viscous dark oil, was stored at below 0° C. temperature. Counter-current distribution of this material was as follows: The solvent system consisted of water saturated with ethyl acetate in the lower phase, and ethyl acetate saturated with water in the upper phase. The above-described oil preparation of sphaeropsidin was dissolved in upper phase so that the solution contained 0.4 to 0.5 g. of oil/ml. 50 ml. of this solution together with 50 ml. of lower phase was placed in tubes 0 to 4 of a 200 tube Craig apparatus. The distribution was carried out for 200 transfers. The tubes were monitored by transferring the contents of every fourth tube to an individual beaker and allowing the solvent to evaporate in a hood. The residues were dissolved, each in 5 ml. of acetone, and one $\lambda$ (1/1000 ml.) of each solution was spotted on silica gel $GF_{254}$ (E. Merck AG) microslide plates; the plates were developed with ethyl acetate. Sphaeropsidin could be detected as a UV absorbing spot which moved approximately one-third the distance of the solvent front. The plates were sprayed with 10% phosphomolybdic acid and heated at 100° C. Those fractions (tubes 20 to 40) which were free of most other contaminants, except for a material detected at the origin of the thin-layer chromatography, were combined and concentrated under nitrogen at 30° to yield 6.0 to 7.0 g. of colored oil containing sphaeropsidin. This oil was dissolved in 80 ml. of acetone, stirred for 10 minutes with 20 g. of activated carbon, and filtered through a short column of 40 g. of silica gel (0.05–0.20 mm.) which had been pre-washed with acetone. Vacuum was applied to the receiver as necessary to maintain a free flow of filtrate while the column was washed with 2–50 ml. volumes of acetone. The combined filtrate and wash, which contained sphaeropsidin, was stored at 0° C. The titer of this material was obtained by evaporating a 1.0 ml. portion of acetone solution quickly under a stream of nitrogen, dissolving the residue in 1.0 ml. of water and free-drying. This freeze-dried sample was used to run various chemical and physical tests which identified the product as sphaeropsidin.

CHEMICAL AND PHYSICAL PROPERTIES OF SPHAEROPSIDIN

Elemental analyses.—Calcd. for $C_7H_8O_4$ (percent): C, 53.84; H, 5.16. Found (percent): C, 52.83, 53.40; H, 5.27, 5.92. Molecular weight: 156 (mass spectrometry). Optical rotation: $[\alpha]_D^{25} = +80°$ ($H_2O$). UV: $\epsilon 238$ m$\mu$ ($H_2O$), 3900–4600.

IR spectrum. Sphaeropsidin gave the following IR absorption bands when suspended in mineral oil mull:

| Function: | Cm.$^{-1}$ |
| --- | --- |
| OH | 3350 |
| CH | 2920, 2880 |
| C=O | 1690 |
| C=C | 1610, 1515 |
| C—O | 1230, 1200, 1145, 1100 |
| Skeletal C=CH | 1055, 1025, 1005 |

EXAMPLE 2

Sphaeropsidin tetraacetate

Sphaeropsidin (1.55 g.), prepared as in Example 1, was dissolved in 12 ml. of pyridine and treated at 10 minute intervals with 0.5 ml. of acetic anhydride. The course of the reaction was monitored by spotting samples of the reaction mixture on thin-layer chromatography silica gel microslide plates and developing these in ethyl acetate. The plates were sprayed with a 50:50 mixture of concentrated sulfuric acid and methanol and heated at 100–110° C. for 5 minutes. The reaction proceeded through at least one intermediate species and was also accompanied by a decomposition product which remained at the origin of the thin-layer chromatography plate. It was essentially complete in 70 minutes (3.5 ml. of acetic anhydride added). After 90 minutes the mixture was diluted with 90 ml. of water and stirred for 60 minutes when it was extracted with ether, the extract washed with dilute hydrochloric acid, water, 5% sodium bicarbonate solution, water, and dried over sodium sulfate. The solvent was removed to give a yellow oil which was chromatographed over 75 g. of Florisil (a mixture of magnesium and sodium trisilicates) eluting in hundred ml. fractions by the gradient method with 3400 ml. of Skellysolve B (isomeric hexanes) containing increasing portions of acetone from 0 to 30%. Fractions 14–17 contain the crystalline sphaeropsidin acetate which was crystallized from Skellysolve B-acetone; yield 0.190 g. of spheropsidin tetraacetate having a melting point of 92–93° C.

Analysis.—Calcd. for $C_{15}H_{16}O_8$ (percent): C, 55.55; H, 4.97. Found (percent): C, 55.57; H, 5.11.

EXAMPLE 3

Sphaeropsidin chlorotribenzoate

Spheropsidin (1.0 g.), prepared as in Example 1, was dissolved in 8.0 ml. of pyridine and treated with 2.0 ml. of benzoyl chloride. After 30 minutes, an additional 1.0 ml. of benzoyl chloride was added and after 20 minutes the mixture was stirred with 60 ml. of water, and then extracted with ether. The extract was washed with dilute hydrochloric acid, 5% sodium bicarbonate solution, water, and dried over sodium sulfate. The residue from the extract was chromatographed over 10 g. of Florisil and eluted with Skellysolve B plus increasing proportions (2–16%) of acetone. Fifty ml. fractions were collected. Fractions 14–18 contained the solid sphaeropsidin chlorotribenzoate which was crystallized from ether. This crystalline sphaeropsidin chlorotribenzoate had a melting point of 120–122° C.

Analysis.—Calcd. for $C_{28}H_{19}O_6Cl$ (percent): C, 69.06; H, 3.93; Cl, 7.28. Found (percent): C, 68.82; H, 3.75; Cl, 7.75.

EXAMPLE 4

Sphaeropsidin diacetate

A solution of 1.55 g. of spheropsidin, prepared as described in Example 1, in 15 ml. of pyridine, is cooled to 0°–5° C. and 0.5 ml. portions of acetic anhydride are added at 15 minute intervals until a total of 2.0 ml. of acetic anhydride has been added. Every few minutes following addition of the acetic anhydride, samples of the reaction mixture are spotted on silica gel thin-layer chromatogram plates and developed in ethyl acetate. The plates are sprayed with a 50:50 mixture of concentrated sulfuric acid and methanol, and heated at 100–110° C. for 5 minutes. When a substantial amount of the diacetate of sphaeropsidin is present, as shown by the above thin-layer chromatogram analysis (the diacetate is less polar than starting material), about 5 ml. of ethanol is added to destroy excess acetic anhydride. The mixture is evaporated under diminished pressure at below 30° C. to give a residue comprising the diacetate of sphaeropsidin which can be further purified by chromatography over neutral silica gel and elution with Skellysolve B (mixed hexanes) containing increasing proportions of acetone.

EXAMPLE 5

By substituting the acetic anhydride in Example 4 by propionic, succinic, maleic, and phthalic anhydride, there are obtained the corresponding sphaeropsidin dipropionates, -disuccinates, -dimaleates, and -diphthalates.

EXAMPLE 6

By substituting the acetic anhydride in Example 2 by propionic, succinic, maleic, and phthalic anhydride, there are obtaned the corresponding sphaeropsidin tetrapropionates, -tetrasuccinates, -tetramaleates, and -tetraphthalates.

EXAMPLE 7

By substittuing the benzoyl chloride in Example 3 by acetyl chloride, propionyl chloride, butyryl chloride, valeryl chloride, hexanoyl chloride, heptanoyl chloride, and octanoyl chloride, there are obtained the corresponding sphaeropsidin chlorotriacetate, -chlorotripropionate, -chlorotributyrate, -chlorotrivalerate, -chlorotrihexanoate, -chlorotriheptanoate, and -chlorotrioctanoate.

We claim:
1. Antibiotic sphaeropsidin, a compound of the following structural formula:

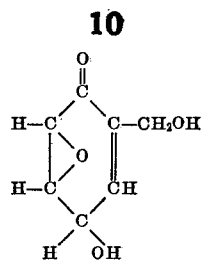

(I)

References Cited

Derwent Farm. Doc. No. 32,836, publ. Oct. 17, 1966, pp. 795–803.

NORMA S. MILESTONE, Primary Examiner

U.S. Cl. X.R.

195—81; 260—479, 476; 424—278